(12) United States Patent
Bon

(10) Patent No.: US 11,005,734 B2
(45) Date of Patent: May 11, 2021

(54) SERVICE BROKER FOR CLOUD FOUNDRY PLATFORM

(71) Applicant: AGARIK SAS, Saint-Ouen (FR)

(72) Inventor: Christophe Bon, St. Maur des Fosses (FR)

(73) Assignee: AGARIK SAS, Saint-Ouen (FR)

( * ) Notice: Subject to any disclaimer, the term of this patent is extended or adjusted under 35 U.S.C. 154(b) by 154 days.

(21) Appl. No.: 16/232,809

(22) Filed: Dec. 26, 2018

(65) Prior Publication Data
US 2019/0207828 A1    Jul. 4, 2019

(30) Foreign Application Priority Data

Dec. 29, 2017   (FR) ...................................... 1763375

(51) Int. Cl.
*G06F 15/173* (2006.01)
*H04L 12/24* (2006.01)
*H04L 29/08* (2006.01)
*G06F 9/50* (2006.01)

(52) U.S. Cl.
CPC ........ *H04L 41/5051* (2013.01); *G06F 9/5072* (2013.01); *H04L 41/5096* (2013.01); *H04L 67/02* (2013.01); *H04L 67/2809* (2013.01); *H04L 67/2823* (2013.01)

(58) Field of Classification Search
USPC .................... 709/226, 249, 250, 223, 230
See application file for complete search history.

*Primary Examiner* — Lan Dai T Truong
(74) *Attorney, Agent, or Firm* — Arc IP Law, PC; Joseph J. Mayo

(57) ABSTRACT

Aurora Service broker for Cloud Foundry platform wherein the Aurora Service broker comprise an hardware and software arrangement to form an interface between the Cloud Foundry platform and Amazon Web Service (AWS) allowing the AWS Service available to applications through Cloud Foundry platform.

7 Claims, 2 Drawing Sheets

SERVICE BROKER FOR CLOUD FOUNDRY PLATFORM

TECHNICAL FIELD OF THE INVENTION

Figure 1:
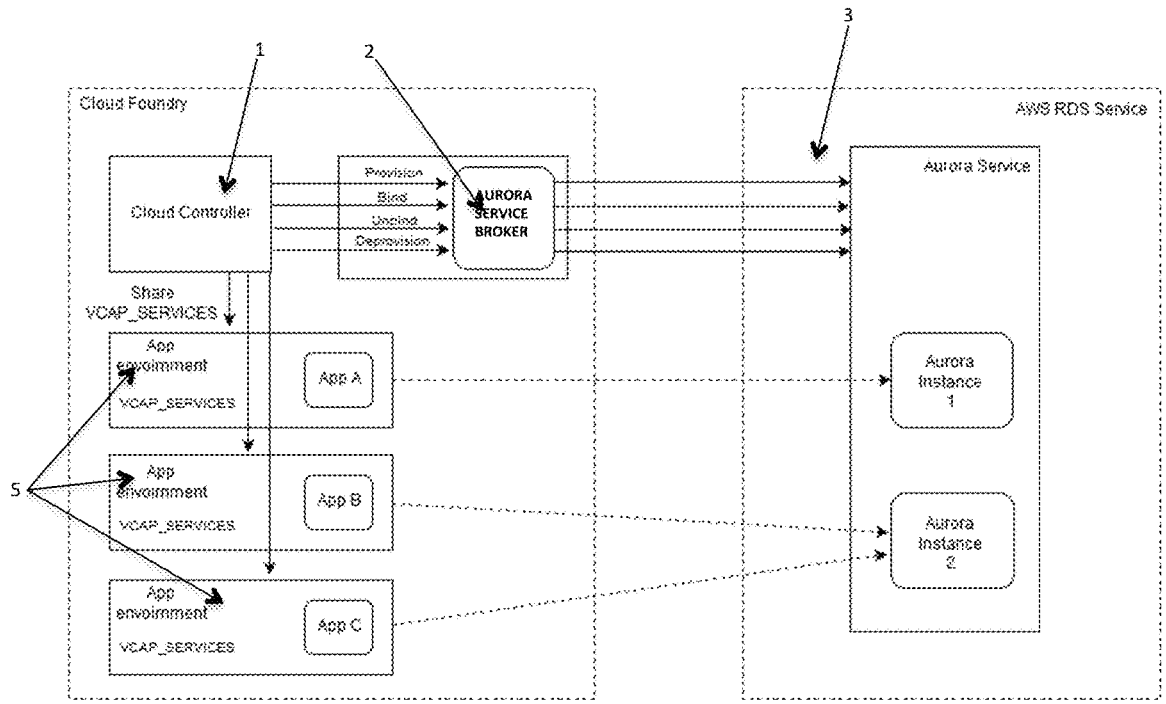

The invention relates to the field of Cloud Foundry platform system.

STATE OF THE PRIOR ART

Cloud Foundry is an open source, multi cloud application platform as a service (PaaS). It is promoted for continuous delivery as it supports the full application development lifecycle, from initial development through all testing stages to deployment. Cloud Foundry's container-based architecture runs applications in any programming language over a variety of cloud service providers. This multi-cloud environment allows developers to and moves those workloads as necessary within minutes with no changes to the application.

Amazon Web Service (AWS) is a secure cloud computing platform which give access to different services and particularly to AWS Relational Database Service (AWS RDS), and AWS RDS Aurora which is a fully managed, MySQL-PostgreSQL-compatible, relational database engine. AWS RDS Aurora combines the seed and reliability of high-end commercial databases with simplicity and cost-effectiveness of open source databases. AWS RDS provides administration for Aurora by handling routine database task such as provisioning, patching, backup, recovery, failure detection and repair; it also provides push-button migration tools to convert existing Amazon RDS for MySQL and Amazon RDS for PostgreSQL application to Aurora However, on a regular Cloud Foundry platform system, the AWS RDS service is not available to applications through Cloud Foundry platform.

In addition, applications in Cloud Foundry platform using MySql can not always use the AWS RDS format which is more efficient for increase operational speed.

Therefore there is a need for a system that allows developers to use such services.

DISCUSSION OF THE INVENTION

The present invention therefore has the object of proposing a Services broker application for Cloud Foundry platform which will provision and de-provision required Aurora database instance in AWS.

Indeed, the created database instance can be used to bind and unbind to compatible application, giving the possibility of overcoming at least one portion of the drawbacks of the prior art.

Aurora Service broker (2) for Cloud Foundry platform allowing the developer to provide, manage and scale their application in a cloud wherein the Aurora Service broker (2) comprise an hardware and software arrangement (20, 21, 22, 23) consisting of at least one processor and a memory provided with software, the processor being able to execute software stored in the memory to form an interface between the Cloud Foundry Open source Platform and Amazon Web Service (3) allowing the AWS Cloud Service available to applications through Cloud Foundry platform, wherein the interface between the Cloud Foundry Open source Platform and Amazon Web Service (3) comprises an hardware and software arrangement consisting of at least one processor and a memory provided with software, the processor being able to execute software stored in the memory to form at least a Rds Broker (20), a Rds Helper (21), Credentials information memorized (22), Service and Plans information memorized (23) in memory.

Advantageously, the Rds Broker is a first class that communicates to cloud foundry platform by implementing API which Cloud foundry platform calls, such as Authenticate, Catalog, Provision, Poll for Provision, Poll for De-provision, Bind, Unbind, De-provision.

In another embodiment, the Rds Helper is a second class that implements methods called by Rds Broker class to communicate with AWS by using 'aws-sdk' library methods to perform requested operations on AWS and shares information back to Rds Broker class.

Advantageously, Credentials information are memorized in a module, which contains the credentials to authenticate the service broker application, AWS credentials and RDS Aurora instance Administrator credentials.

Advantageously, Service and Plans information are memorized in a module, which can be separated in two sub modules: Service and Plans, Service/Plans module can contain the catalog information that RDS Broker class module share with the platform, the catalog information can be the services and plans details.

An other object is a Cloud Foundry platform system comprising at least:
- an hardware and software arrangement forming a Cloud Controller.
- an hardware and software arrangement forming at least one Application environment each running one Application (App A, App B, App C), share by the cloud Controller in "VCAP_SERVICES",
- an hardware and software arrangement forming a Interface for the user, wherein the Cloud Foundry platform comprise also an hardware and software arrangement forming an Aurora Service Broker according to the invention.

Advantageously, the hardware and software arrangement forming a Aurora Service Broker allows the execution of Aurora instances on an hardware and software arrangement forming by Aurora Service included in the AWS RDS service to run AWS specific application and share them to the Cloud Controller.

SHORT DESCRIPTION OF THE FIGURES

Figure 2:
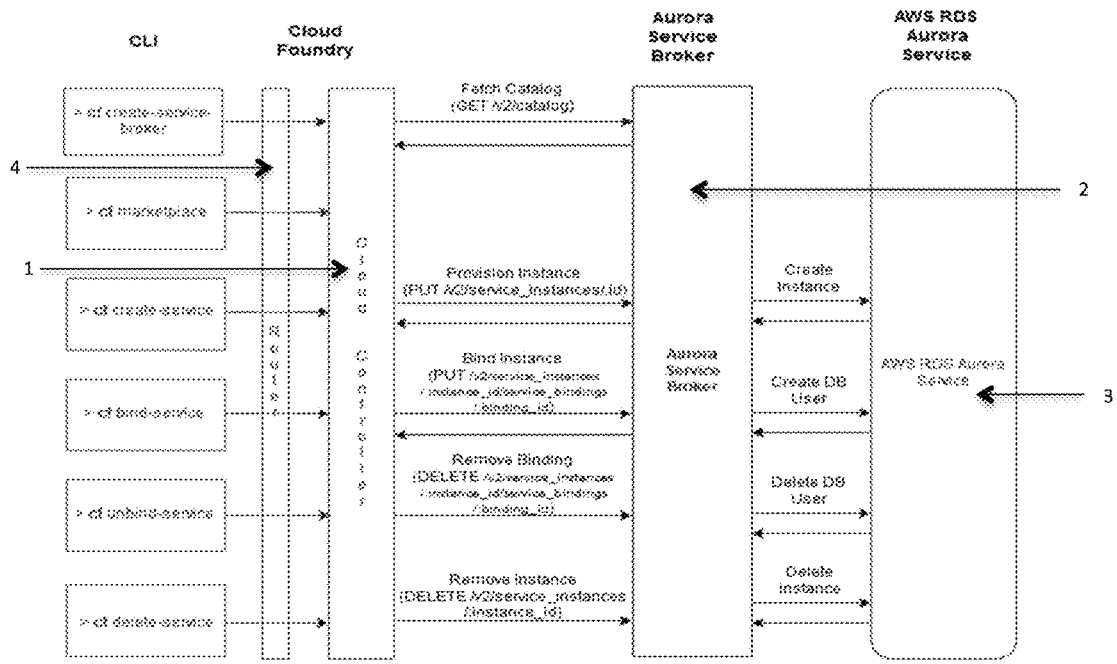
Figure 3:
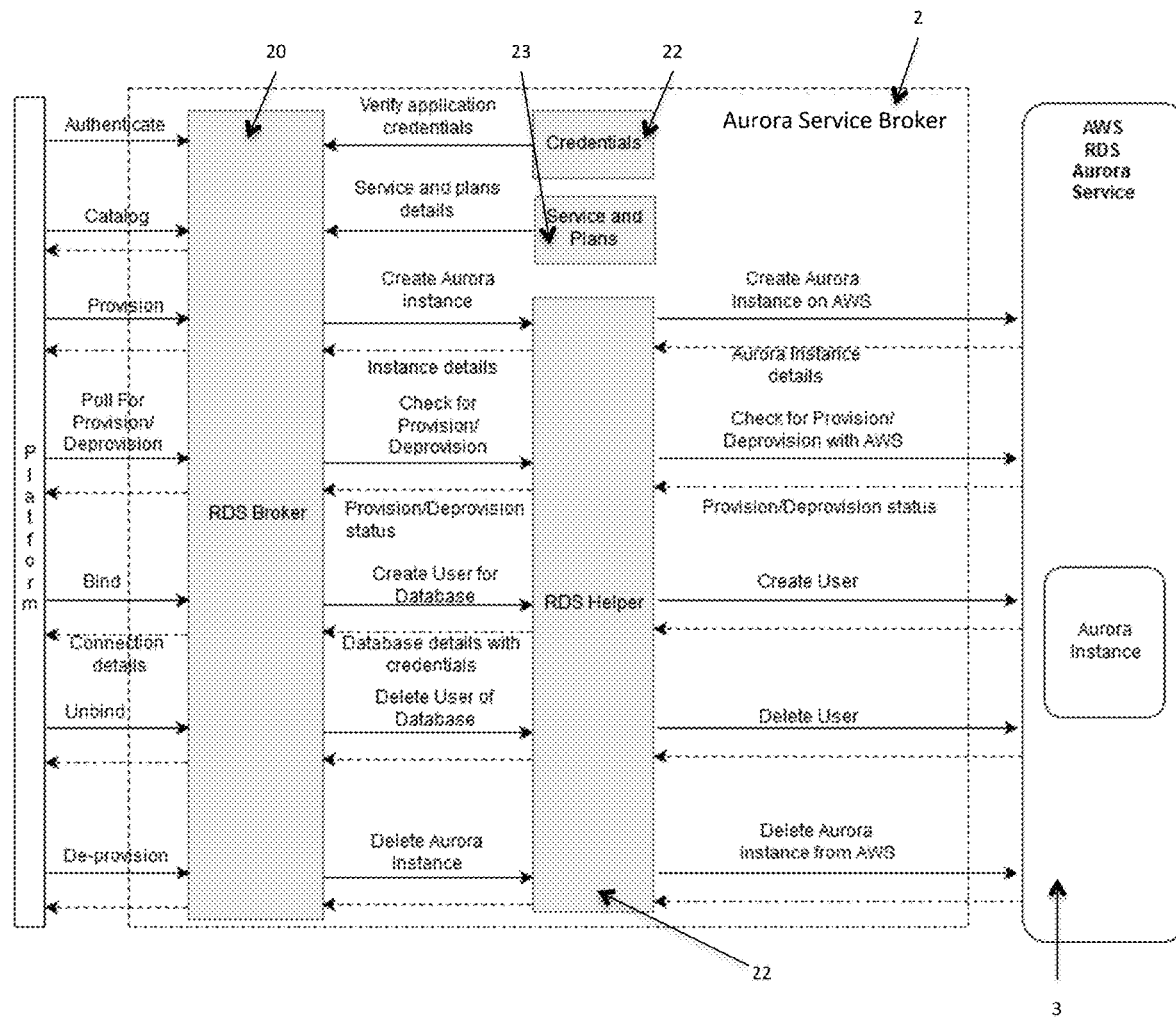

Other features, details and advantages of the invention will become apparent upon reading the description which follows with reference to the appended figures, which illustrate:

FIG. 1, illustrates the Service Broker on Cloud foundry environment with AWS RDS Aurora Service FIG. 2 represents an example of available Service Broker communication with Cloud foundry platform and AWS FIG. 3 represents an example of available Aurora Service Broker internal modules.

DETAILED DESCRIPTION OF DIFFERENT EMBODIMENTS OF THE INVENTION

Many combinations may be contemplated without departing from the scope of the invention; one skilled in the art will select either one depending on economical, ergonomical, dimensional constraints or others which he/she will have to observe.

Cloud Foundry platform system is powered by Core OSS Cloud foundry which is Open source Platform as a Service.

It allows the developer to provide, manage and scale their application in the cloud as hassle free process.

More particularly, according to an embodiment illustrated by the FIG. 1, a Cloud Foundry platform can comprise at least:
- an hardware and software arrangement forming a Cloud Controller (1).
- an hardware and software arrangement forming a Service Broker (2) and allowing the execution of Aurora instances on an hardware and software arrangement forming Aurora Service included in the AWS RDS service to run AWS specific application and share them to the Cloud Controller,
- an hardware and software arrangement forming at least one Application environment (5) (App environment) for each Application (App A, App B, App C) forming instances on aurora service, shared by the cloud Controller in virtual services "VCAP_SERVICES",
- an hardware and software arrangement forming a Interface for the user.

To allow the Cloud Foundry Platform to use AWS RDS services, a hardware and software arrangement called Aurora Service Broker is used to communicate with the AWS RDS Services making those available to the user.

The Aurora Service Broker (2) is a hardware and software arrangement placed between the Cloud Foundry (1) and the AWS RDS Services (3) (also called AWS RDS Aurora Services).

As illustrated by the FIG. 2, the user through an interface, which can be for example a Command Line Interface (CLI) or a Graphic User Interface (GUI), generate and send to the Cloud controller (1) instructions to access AWS RDS Services through the Aurora service broker (2). These instructions are for instances, "cf create-service-broker", "cf market-place", "cf create-service", "cf bind-service", "cf unbind-service", cf delete-service":
- "cf create-service-broker" is for enabling cloud controller to be connected with a specific service broker (2)
- "cf market-place" is for enabling cloud controller to generate a list of service in function of the connected service broker,
- "cf create-service" is for enabling cloud controller (1) to generate a command for provisioning service instances with Id to the service broker (2) which will generate a command "create instance" towards the AWS cloud service (3) and returning back to cloud controller (1) the reply of AWS cloud service. Cloud controller is sending some information contained in the reply to the user through router (4).
- "cf bind-service" is for enabling cloud controller (1) to generate a command "Bind instance" transmitting information "instance-Id" and "binding-id" for the binding service to the broker (2) to enable broker to send to AWS cloud service (3) a command "create DB User" enabling the creation of a User in the Database to retrieve in Database of the cloud the data generated by each instances.
- "cf unbind-service" is for enabling cloud controller (1) to generate a command "Unbind instance" transmitting information "instance-Id" and "binding-id" for the unbinding service to the broker (2) to enable broker to send to AWS cloud service (3) a command "Delete DB User" enabling the deletion of a User in the Database.
- "cf delete-service" is for enabling cloud controller (1) to generate a command "Remove instance" transmitting information "instance-Id" to the broker (2) to enable broker to send to AWS cloud service (3) a command "Delete instance" enabling the deletion of the instance from cloud server (3).

In some embodiment, the Aurora Service Broker comprises for example a Sinatra application coded in Ruby. Sinatra is a free and open source software web application library and domain-specific language written in Ruby. It is an alternative to other Ruby web application frameworks such as Ruby on Rails, Merb, Nitro, and Camping.

A Cloud Broker is "an entity that manages the use, performance and delivery of cloud services, and negotiates relationships between cloud providers and cloud consumers As illustrated by the FIG. 3, the Aurora Service Broker comprise a hardware and software arrangement which include at least a Rds Broker (20), a Rds Helper (21), Credentials information memorized (22), Service and Plans information memorized (23) in memory.

Rds Broker (20) is a first class that communicates to cloud foundry platform by implementing API which Cloud foundry platform calls, such as Authenticate, Catalog, Provision, Poll for Provision, Poll for De-provision, Bind, Unbind, De-provision:
- Authenticate to authenticate the user or application credentials;
- Catalog, this API respond to Cloud Controller with Aurora Service Broker Services and Plans information as for example in Json format, and the Cloud Foundry platform shows this information to the user by showing which user can select service and/or plan or whether user is authorized or not to select service and/or plan;
- Provision, this API manages to create Aurora service instance on AWS passing through RDS helper module, as per selected plan on created service instance request send by the user;
- Poll for Provision/Deprovision;
- Blind, this API creates user for Aurora Database and shares the connection details with credentials to the Cloud Foundry platform in "VCAP_SERVICES" for a particular application through the RDS Helper module;
- Unbind, this API deletes the created user which results in restricting the application to use the Aurora database instance.
- De-provision, this API is responsible to delete the provisioned Aurora instance from AWS on delete service request though RDS Helper module.

Rds Helper (21) is a second class that implements methods called by Rds Broker class. This class communicates with AWS (3) by using 'aws-sdk' library methods to perform requested operations on AWS (3) and shares the information back to Rds Broker class. Such instructions can be for example: Create Aurora instance, Check for provision/deprovision, Create user for database, Delete user of database, Delete Aurora instance.

Credentials information memorized in a module (22), which contains the credentials to authenticate the service broker application, AWS (3) credentials and RDS Aurora instance Administrator credentials.

Service and Plans information memorized in a module (23), which can be separated in two sub modules: Service and Plans. Service/Plans module can contain the catalog information that RDS Broker class module share with the platform, the catalog information can be the services and plans details. By using this information, Aurora instance of selected plan can be created on AWS.

In some embodiment, the RDS Broker verifies in function of the instruction given by the Cloud Foundry platform, the application credential using the credentials contained in the Credentials module.

It will be easily understood upon reading the present application that the particularities of the present invention, as generally described and illustrated in the figures, may be arranged and designed according to a great variety of different configurations. Thus, the description of the present invention and the related figures are not provided for limiting the scope of the invention but simply illustrating selected embodiments.

One skilled in the art will understand that the technical features of a given embodiment may in fact be combined with features of another embodiment unless the opposite is explicitly mentioned or if it is obvious that these features are incompatible. Further, the technical features described in a given embodiment may be isolated from the other features of this embodiment unless the opposite is explicitly mentioned.

It should be obvious for persons skilled in the art that the present invention allows embodiments under many other specific forms without departing from the field defined by the scope of the appended claims, these embodiments should be considered as an illustration and the invention should not be limited to the details given above.

The invention claimed is:

1. An Aurora Service broker for Cloud Foundry platform allowing a developer to provide, manage and scale their application in a cloud wherein the Aurora Service broker comprise a hardware and software arrangement comprising at least one processor and a memory provided with software, the processor being able to execute software stored in the memory to form an interface between the Cloud Foundry Platform and Amazon Web Services (AWS) allowing an AWS Cloud Service available to applications through Cloud Foundry platform,
wherein the interface between the Cloud Foundry Platform and AWS comprises a hardware and software arrangement comprising at least one processor and a memory provided with software, the processor being able to execute software stored in the memory to form at least a Rds Broker, a Rds Helper, Credentials information memorized, Service and Plans information memorized in memory.

2. The Aurora Service broker according to claim 1, wherein Rds Broker is a first class that communicates to the Cloud Foundry Platform by implementing an API which Cloud foundry platform calls, comprising at least one of Authenticate, Catalog, Provision, Poll for Provision, Poll for De-provision, Bind, Unbind, De-provision.

3. The Aurora Service broker according to claim 1, wherein the Rds Helper is a second class that implements methods called by Rds Broker class to communicate with AWS by using 'aws-sdk' library methods to perform requested operations on AWS and shares information back to Rds Broker class.

4. The Aurora Service broker according to claim 1, wherein Credentials information are memorized in a module, which contains the credentials to authenticate a service broker application, AWS credentials and RDS Aurora instance Administrator credentials.

5. The Aurora Service broker according to claim 1, wherein Service and Plans information are memorized in a module, which can bois separated in two sub modules: Service and Plans, Service/Plans module contains a catalog information that RDS Broker class module shares with the Cloud Foundry platform, the catalog information includes the services and plans details.

6. A Cloud Foundry platform system comprising at least:
a hardware and software arrangement comprising at least one processor and a memory provided with software, the processor being able to execute software stored in the memory to form a Cloud Controller;
a hardware and software arrangement comprising at least one processor and a memory provided with software, the processor being able to execute software stored in the memory to form at least one Application environment each running one Application (App A, App B, App C), shared by the cloud Controller in "VCAP_SERVICES"; and
a hardware and software arrangement comprising at least one processor and a memory provided with software, the processor being able to execute software stored in the memory to form an Interface for a user, wherein the Cloud Foundry platform system further comprises an hardware and software arrangement comprising at least one processor and a memory provided with software, the processor being able to execute software stored in the memory to form an Aurora Service Broker for allowing a developer to provide, manage and scale their application in a cloud wherein the Aurora Service broker comprises a hardware and software arrangement comprising at least one processor and a memory provided with software, the processor being able to execute software stored in the memory to form an interface between the Cloud Foundry Platform and Amazon Web Services (AWS) allowing an AWS Cloud Service available to applications through Cloud Foundry platform, wherein the interface between the Cloud Foundry Platform and AWS comprises a hardware and software arrangement comprising at least one processor and a memory provided with software, the processor configured to execute software stored in the memory to form at least a Rds Broker, a Rds Helper, Credentials information memorized, Service and Plans information memorized in memory.

7. The Cloud Foundry platform system according claim 6, wherein the hardware and software arrangement forming the Aurora Service Broker enables execution of Aurora instances on a hardware and software arrangement forming by Aurora Service included in an AWS RDS service to run AWS specific application and share them to the Cloud Controller.

* * * * *